(12) United States Patent
Ho et al.

(10) Patent No.: US 6,768,526 B2
(45) Date of Patent: Jul. 27, 2004

(54) TIME-SEQUENTIAL COLOR SEPARATOR AND LIQUID CRYSTAL PROJECTOR USING THE SAME

(75) Inventors: Fang-Chuan Ho, Hsinchu (TW); Lai-Chang Lin, Taipei Hsien (TW)

(73) Assignee: Industrial Technology Research Institute (TW)

( * ) Notice: Subject to any disclaimer, the term of this patent is extended or adjusted under 35 U.S.C. 154(b) by 239 days.

(21) Appl. No.: 09/871,618

(22) Filed: Jun. 4, 2001

(65) Prior Publication Data

US 2002/0080304 A1 Jun. 27, 2002

(30) Foreign Application Priority Data

Dec. 21, 2000 (TW) ........................................ 89127527 A

(51) Int. Cl.⁷ .......................................... G02F 1/1347
(52) U.S. Cl. .............................. 349/74; 349/96; 349/97; 349/117; 349/119; 349/80; 349/100; 349/9; 353/20; 353/31; 353/33; 353/34; 353/37; 353/84
(58) Field of Search .............................. 349/57, 77, 34, 349/8, 172, 74, 75; 359/634, 245, 246

(56) References Cited

U.S. PATENT DOCUMENTS

| | | | | |
|---|---|---|---|---|
| 5,300,942 A | * | 4/1994 | Dolgoff ........................ 345/32 |
| 5,463,468 A | * | 10/1995 | Takanashi et al. .......... 358/296 |
| 5,502,490 A | * | 3/1996 | Takanashi et al. .......... 358/296 |
| 5,515,449 A | * | 5/1996 | Tsuruoka et al. ........... 382/128 |
| 5,956,416 A | * | 9/1999 | Tsuruoka et al. ........... 382/128 |
| 5,984,478 A | * | 11/1999 | Doany et al. ................. 353/84 |
| 5,986,815 A | * | 11/1999 | Bryars ........................ 359/634 |
| 6,157,419 A | * | 12/2000 | Mitsutake ...................... 349/9 |
| 6,331,910 B1 | * | 12/2001 | Dultz et al. ................. 359/246 |
| 6,478,429 B1 | * | 11/2002 | Aritake et al. ................ 353/31 |
| 6,498,632 B1 | * | 12/2002 | Butterworth et al. ......... 349/77 |
| 6,568,815 B2 | * | 5/2003 | Yano ........................... 353/84 |

* cited by examiner

Primary Examiner—Nathan J. Flynn
Assistant Examiner—Fazli Erdem
(74) Attorney, Agent, or Firm—Birch, Stewart, Kolasch & Birch, LLP

(57) ABSTRACT

A fast time-sequential color separator that can fast-switch to output various wavelength ranges of lights having high color purity and a high contrast ratio, which includes: a prism module to separate an incident light into various wavelength ranges of light beams which are emitted from various prisms of the prism module; a plurality of ferroelectric liquid crystal panels, respectively placed on emerging surfaces of the various wavelength ranges of light beams, to reflect the various wavelength ranges of light beams to the prism module; and a power supply, respectively connected to the plurality of ferroelectric liquid crystal panels, to fast-switch the liquid crystal panels, respectively, to sequentially emit the various wavelength ranges of light beams from the prism module. Furthermore, a full color LCD projector can be constructed by the color separator, a transmissive or reflective fast response display element such as a liquid crystal light valve, and other elements such as micro-mirrors, etc.

18 Claims, 9 Drawing Sheets

TIME-SEQUENTIAL COLOR SEPARATOR AND LIQUID CRYSTAL PROJECTOR USING THE SAME

BACKGROUND OF THE INVENTION

1. Field of the Invention

The present invention relates to a color separator, especially to a time-sequential color separator and a liquid crystal projector including the color separator.

2. Description of the Related Art

Conventional color separators are normally classified into mechanical type and electronic type. The former uses various color filters to mechanically separate color lights from an incident white light. Such a mechanical type color separator normally has a complex structure, a big volume and all of the drawbacks due to mechanical movement. The latter is constructed by electronic circuits and light valves. Therefore the quality of an electronic type color separator is related to the response speed of light valve, the transmittance, the color purity and the contrast ratio.

A conventional electronic type color separator as disclosed in U.S. Pat. No. 4,232,948 by Shanks uses a liquid crystal light valve, which can change the polarization of a light passing therethrough, and a retarder having a birefringence effect to change the observed color of the light passing through the device. The transmittance, the switching speed and the color purity obtained by such a color separator is not desirable. Furthermore, in U.S. Pat. No. 5,347,378, Handschy et al. utilize a structure which combines a color-selective filter with a fast-switching liquid crystal light valve. However, the transmittance and the color purity obtained by the color separator are still not satisfactory.

Accordingly, in "High Brightness Saturated Color Shutter Technology," SID Symposium, Vol. 27, p.411, 1996 by Sharp and Johnson and "Retarder Stack Technology for Color Manipulation," SID, 1999, by G. D. Sharp and T. R. Brige, a time-sequential three primary color switch having a high response speed and a saturated chromaticity, which combines a polarization retarder stack (PRS) and a fast-switching liquid crystal light valve, is disclosed. The device disclosed in U.S. Pat. No. 5,751,380 was developed by ColorLink, Inc., as a commercial product known as "ColorSwitch α". The relevant description can be referred to in "High Throughput Color Switch for Sequential Color Projector," SID 2000 Digest, p.96, 2000, by G. B. Sharp, et al.

FIG. 1 illustrates the structure of the color switch disclosed by G. B. Sharp, in which the reference numeral 10 and 20 respectively represent visible light polarizer, the reference numeral 1, 2, 3 respectively represent light valve units of red color, green color and blue color. The red-color light valve unit 1 includes a ferroelectric liquid crystal (FLC) panel 100, a front PRS 11 and a rear PRS 12. The green-color light valve unit 2 includes an FLC panel 200, a front PRS 13 and a rear PRS 14. The blue-color light valve unit 3 includes an FLC panel 300, a front PRS 15 and a rear PRS 16. A time-sequential pulse 400 is respectively connected to the FLC panels 100, 200 and 300 to emit the polarized red light, green light and blue light in sequence.

Refer to FIG. 2, which is relevant prior art disclosed by the inventor and filed as a patent application entitled as "FIELD SEQUENTIAL COLOR PROJECTION DISPLAY", whose application No. is 09/524,051. In this prior art, the dichroic prisms 90~95 are used for color separation and recombination. The three FLC panels 70, 72 and 74 are controlled by a time-sequential pulse 110 to emit the light beams of red color, green color and blue color in sequence. The switching speed of the field sequential color projection display system can achieve 0.05 msec. Furthermore, there is substantially no energy loss for the light beams of three primary colors since the system is constructed by dielectric interference filters. However, the alignment of this prior-art system is difficult.

The drawback of the above-described prior arts using FLC panels is the limitation of contrast ratio when a light beam passes through the FLC panel. Therefore, in order to overcome the shortcomings of the prior art, it is important to increase the contrast ratio of the light valve, as well as the response speed of the FLC panel.

SUMMARY OF THE INVENTION

Accordingly, an object of the present invention is to provide a fast time-sequential color separator that can be fast switched to output various wavelength ranges of lights having high color purity and high contrast ratio.

A full color LCD projector can be constructed by the color separator, a transmissive or reflective fast-response display element such as a liquid crystal light valve, and other elements such as micro-mirrors, etc.

This invention takes advantage of non-absorption of the interference polarizer and large aperture ratio, high contrast ratio and fast response speed of the reflective ferroelectric liquid crystal panel to constitute a three primary color separator. The polarized incident white light is separated into the light beams of three primary colors by the color filters. A time-sequentially-controlled single-pixel reflective FLC panel then sequentially reflects the color light beams to a single panel of FLC display. The frame frequency of the FLC display can be larger than 0.15 MHz. The CIE coordinates of the three primary colors obtained by the color separator of this invention are (x=0.65, y=0.31), (x=0.28, y=0.69) and (x=0.12, y=0.09), respectively.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention bill become apparent to those skilled in the art from this detailed description.

BRIEF DESCRIPTION OF THE DRAWINGS

The present invention can be more fully understood by reading the subsequent detailed description in conjunction with the examples and references made to the accompanying drawings, which are given by way of illustration only, and thus are not limitative of the present invention, and wherein.

DETAILED DESCRIPTION OF THE PREFERRED EMBODIMENT

Figure 3:
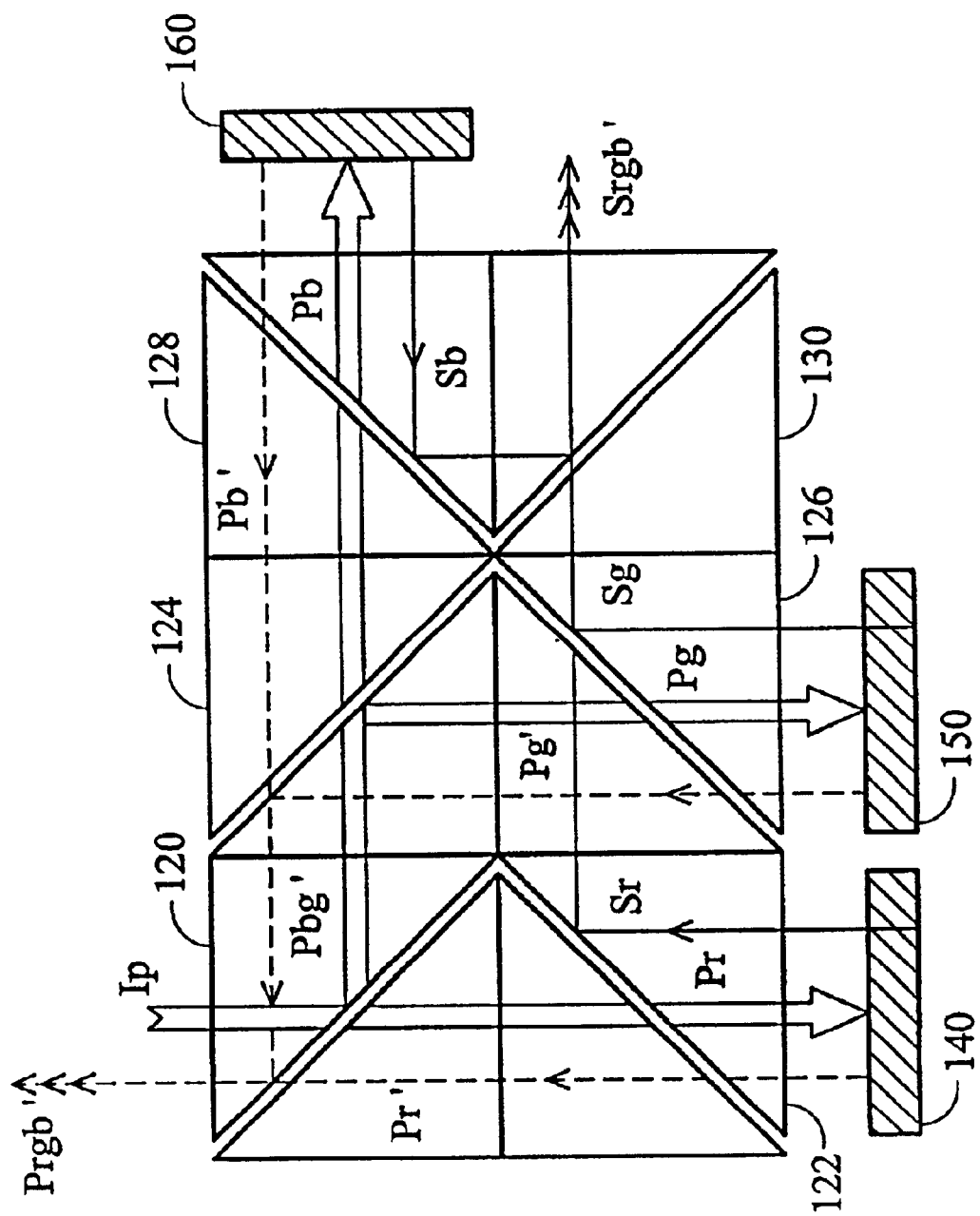
FIG. 3 is a diagram illustrating a color separator according to one embodiment of this invention.
Figure 4A:
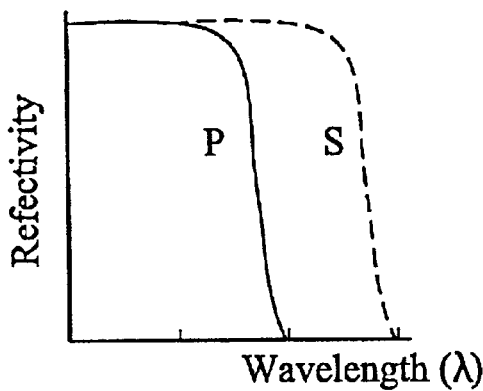
FIGS. 4A to 4F are spectral diagrams of the dichroic filters in the prisms of FIG. 3.
Figure 4B:
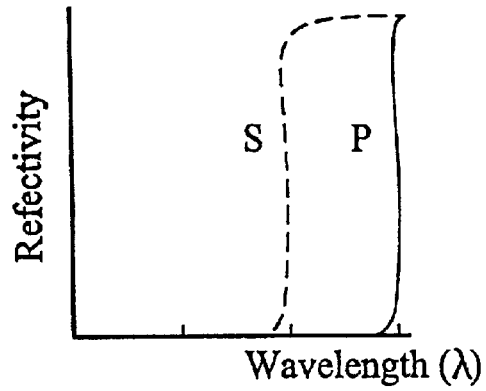
Figure 4C:
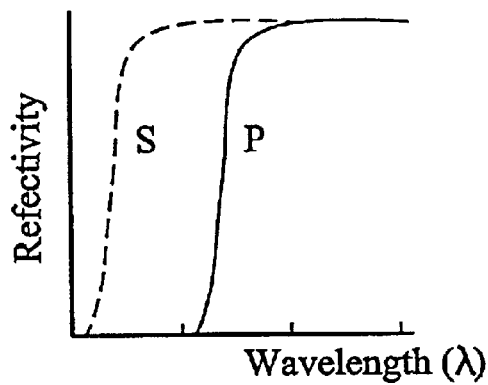
Figure 4D:
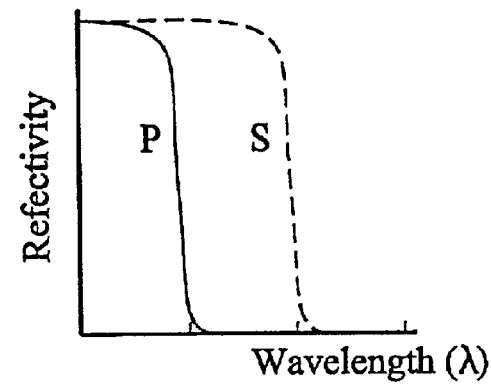
Figure 4E:
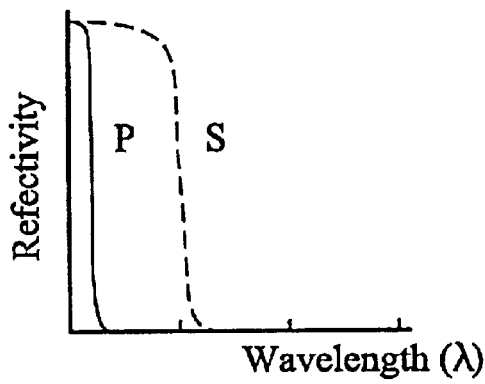
Figure 4F:
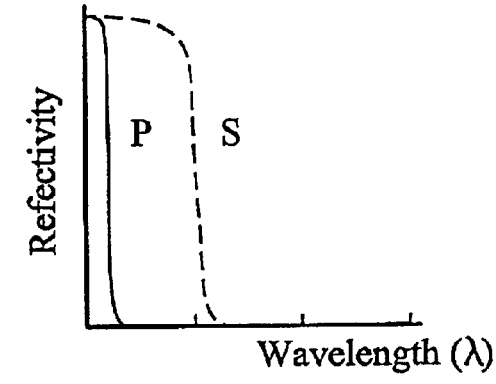

Referring to FIG. 3, this invention includes a prism module that is constructed by six dichroic prisms 120, 122, 124, 126, 128 and 130, that separate an incident light into various wavelength ranges of light beams which are emitted from various prisms of the prism module; ferroelectric liquid crystal panels 140, 150 and 160, respectively placed on emerging surfaces of the various wavelength ranges of light beams, for reflecting the various wavelength ranges of light beams to the prism module; and a power supply, respectively connected to the ferroelectric liquid crystal panels 140, 150 and 160, for fast-switching the liquid crystal panels, respectively, to sequentially emit the various wavelength ranges of light beams from the prism module. The spectrum of the dichroic prism 120 is as shown in FIG. 4A. The spectrum of the dichroic prism 122 is as shown in FIG. 4B. The spectrum of the dichroic prism 124 is as shown in FIG. 4C. The spectrum of the dichroic prism 126 is as shown in FIG. 4D. The spectrum of the dichroic prism 128 is as shown in FIG. 4E. The spectrum of the dichroic prism 130 is as shown in FIG. 4F.

When a parallel-polarized white light is incident to the prism module, the red component Pr of the parallel-polarized white light passes through the prisms 120 and 122 and is incident to the FLC panel 140. When the FLC panel 140 is switch-on, the parallel-polarized red light Pr (indicated by solid line in the drawing) is reflected and converts into a vertical-polarized red light Sr, which is then reflected by the prism 122 to pass through the prisms 126 and 130 and emerges from the prism 130. When the FLC panel 140 is switch-off, the polarization of the parallel-polarized red light Pr is not changed, the parallel-polarized red light Pr is reflected by the FLC panel 140 to pass through the prisms 122 and 120. The reflected parallel-polarized red light Pr' emerges from the prism module along the incident optical path.

The green component Pg and the blue component Pb of the parallelly polarized white light is directed toward the prism 124 after it is reflected by the prism 120. The parallelly polarized green light Pg is reflected by the prism 124 to pass through the prism 126 and is then incident to the FLC panel 150. When the FLC panel 150 is switch-on, the parallel-polarized green light Pg is converted to a vertical-polarized green light Sg, which is reflected by prism 126 and emerges from the prism 130. When the FLC panel 150 is switch-off, the parallel-polarized green light Pg is reflected and maintains its polarization. The reflected parallel-polarized green light Pg' passes through the prism 126 and is sequentially reflected by the prisms 124 and 120 and emerges from the prism module.

The blue component Pb of the parallel-polarized white light is reflected by the prism 120 to pass through the prisms 124 and 128, and then incident to the FLC panel 160. When the FLC panel 160 is switch-on, the parallel-polarized blue light Pb is reflected by the FLC panel 160 and is converted to a vertically polarized blue light Sb, which is sequentially reflected by the prisms 128 and 130 to be emerged from the prism 130. When the FLC panel 160 is switch-off, the parallelly polarized blue light Pb is reflected by the FLC panel 160 and maintains its polarization. The reflected parallel polarized blue light Pb' passes through the prisms 128 and 124 and is then reflected by the prism 120 and emerges along the direction of the incident light Ip.

According to the description above, if a fast pulse voltage source is connected to the FLC panels 140, 150 and 160, the vertically polarized lights of red color, green color and blue color can be sequentially brought out from the right side of the prism 130.

Figure 5:
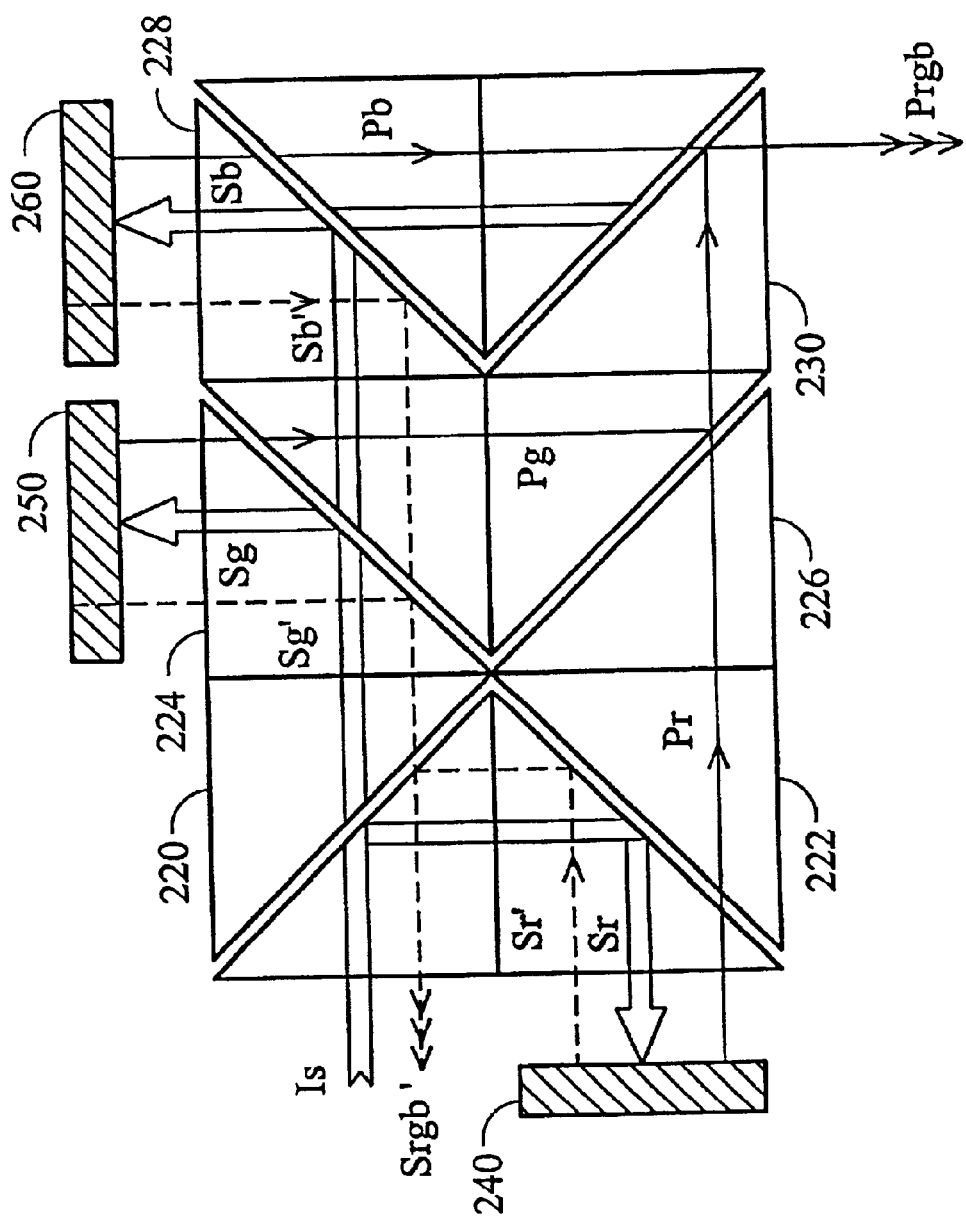
FIG. 5 is a diagram illustrating a color separator according to another embodiment of this invention.
Figure 6A:
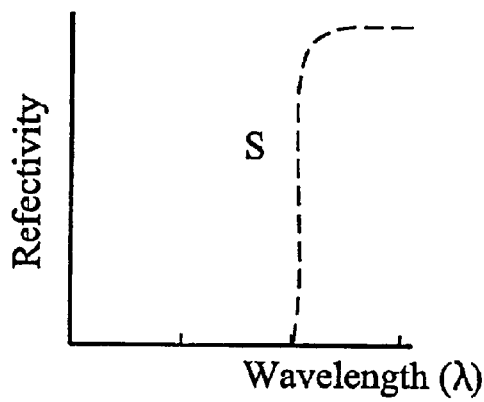
FIG. 6A to 6F are spectral diagrams of the dichroic filters in the prisms of FIG. 5.
Figure 6B:
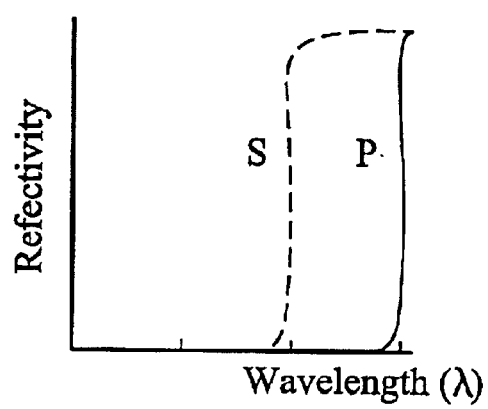
Figure 6C:
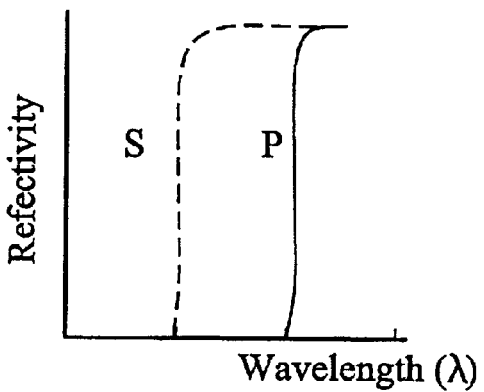
Figure 6D:
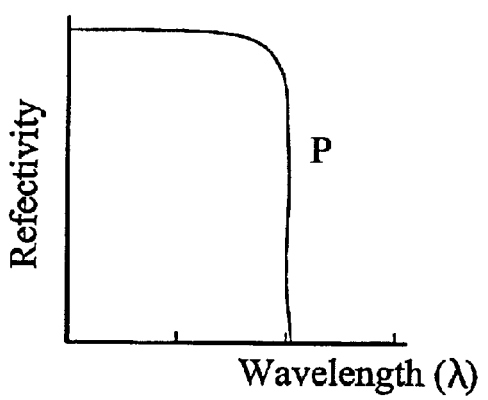
Figure 6E:
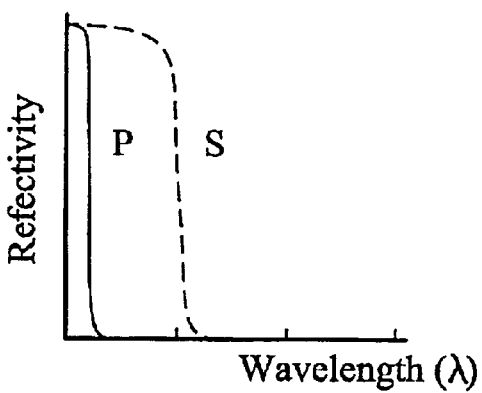
Figure 6F:
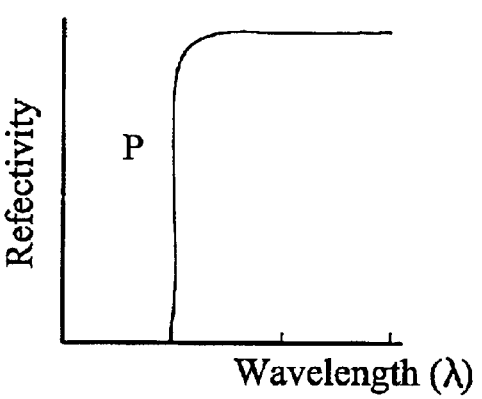

According to another embodiment of this invention, the color separator is constructed as shown in FIG. 5, which is similar to the embodiment of FIG. 3. However, the incident light used in this embodiment is a vertically polarized white light Is. The spectrum of the dichroic prism 220 is as shown in FIG. 6A. The spectrum of the dichroic prism 222 is as shown in FIG. 6B. The spectrum of the dichroic prism 224 is as shown in FIG. 6C. The spectrum of the dichroic prism 226 is as shown in FIG. 6D. The spectrum of the dichroic prism 228 is as shown in FIG. 6E. The spectrum of the dichroic prism 230 is as shown in FIG. 6F.

Figure 7:
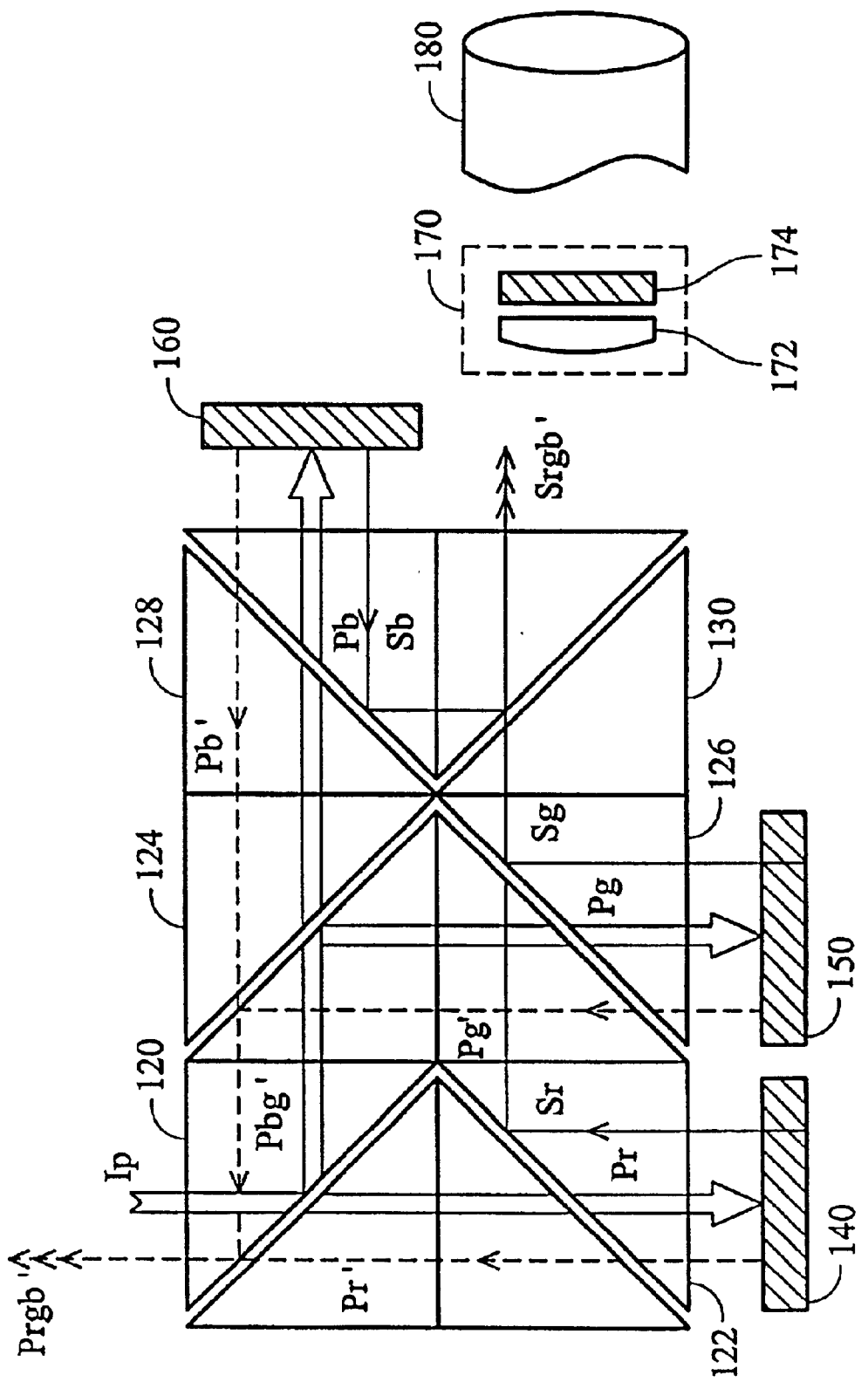
FIG. 7 is a diagram illustrating a liquid crystal projector including the color separator of this invention.
Figure 8:
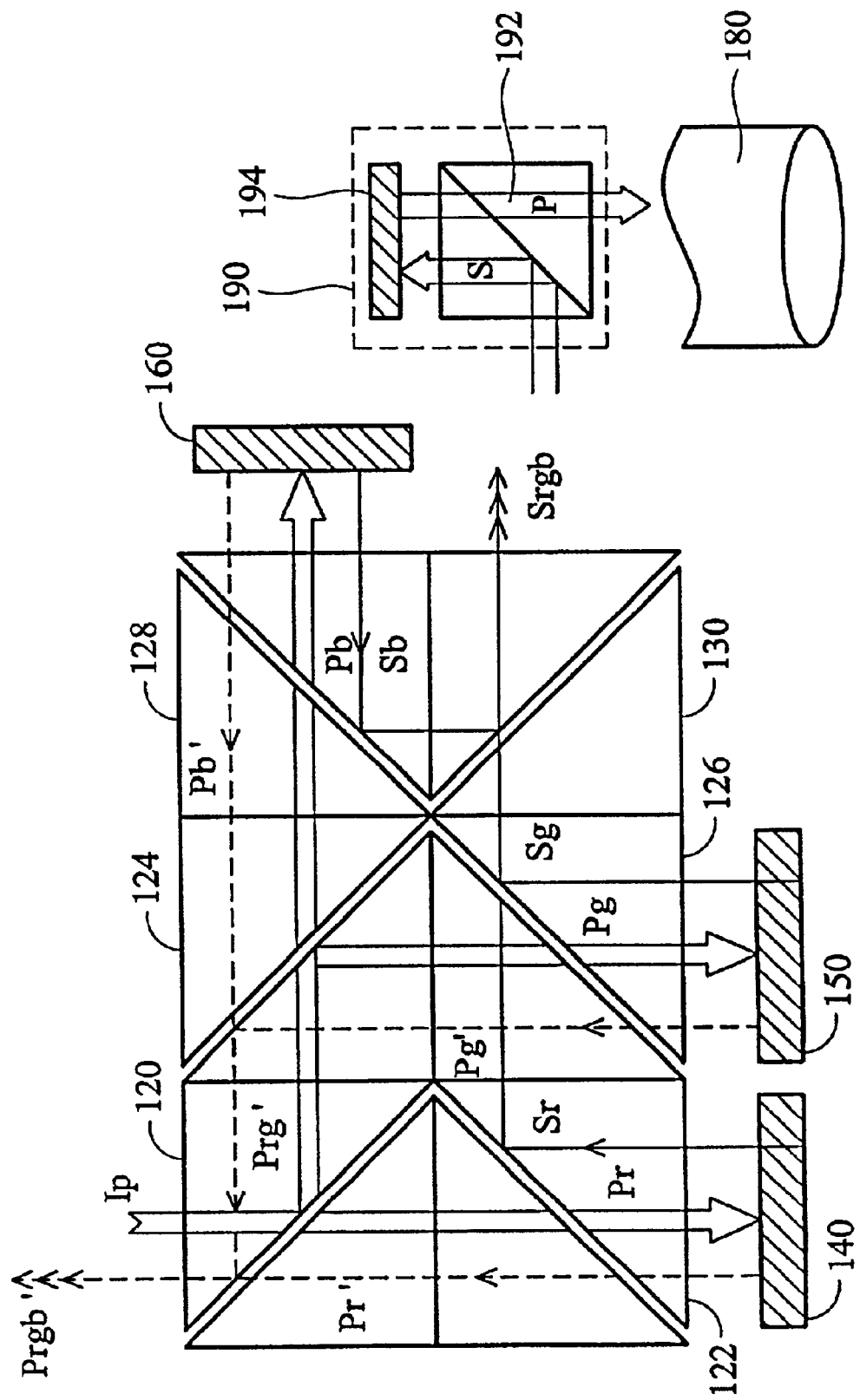
FIG. 8 is a diagram illustrating another liquid crystal projector including the color separator of this invention.

Referring to FIG. 7, the color separator of this invention can be combined with a transmissive liquid crystal display module 170 and a projection lens set 180 to constitute a time-sequential full color liquid crystal projector. Another embodiment is as shown in FIG. 8, in which the color separator is combined with a reflective liquid crystal display module 190 and a projection lens 180 to constitute a time-sequential full color liquid crystal projector.

Figure 9:
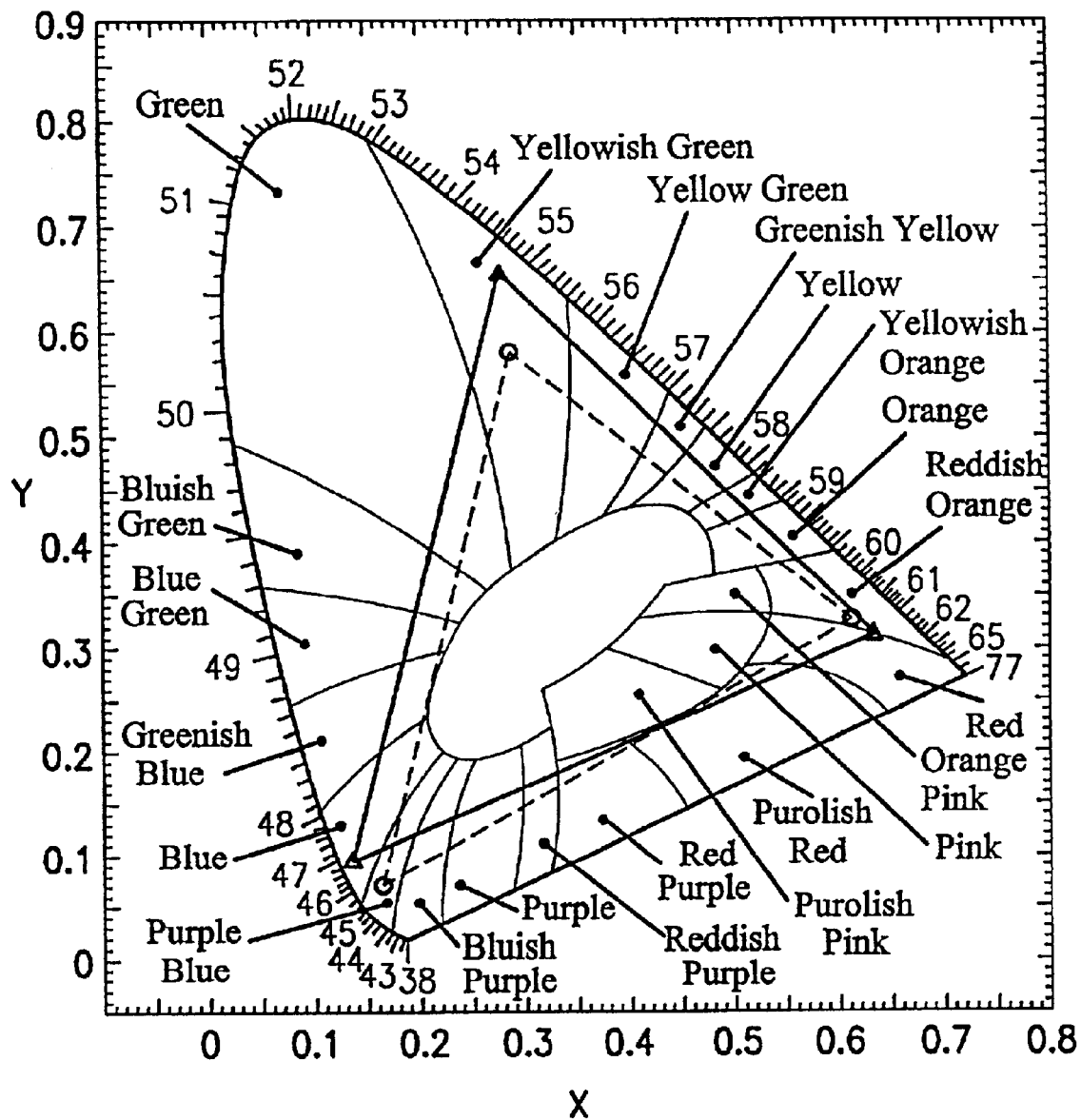
FIG. 9 illustrates the CIE coordinates for the light beams of three primary colors obtained by using the color separator of this invention.

The CIE coordinates of the light beams of red color, green color and blue color of the full color liquid crystal projector using the color separator of this invention are plotted in FIG. 9. In the drawing, the triangular area indicated by the symbol "○" represents the gamut of the prior-art color switch called "ColorSwitch α", and the triangular area indicated by the symbol "Δ" represents the gamut of the color separator of this invention. It is found that the color separator of this invention can obtain color lights having a better color purity.

Compared with the prior arts, this invention has the following advantages:

(i) the contrast ratio of the color separator is improved since the FLC panels used are reflective liquid crystal panels.

Figure 1:
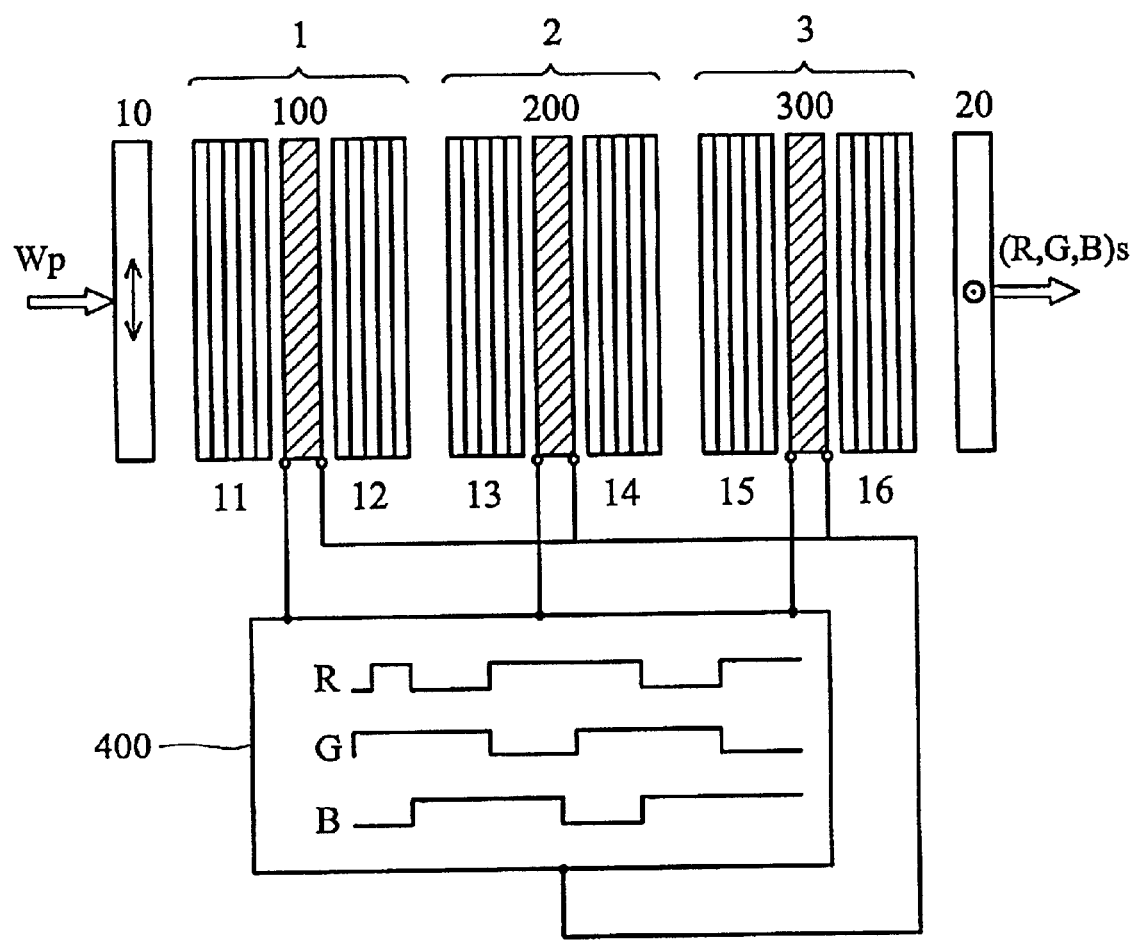
FIG. 1 is a diagram illustrating a prior-art color separator.
Figure 2:
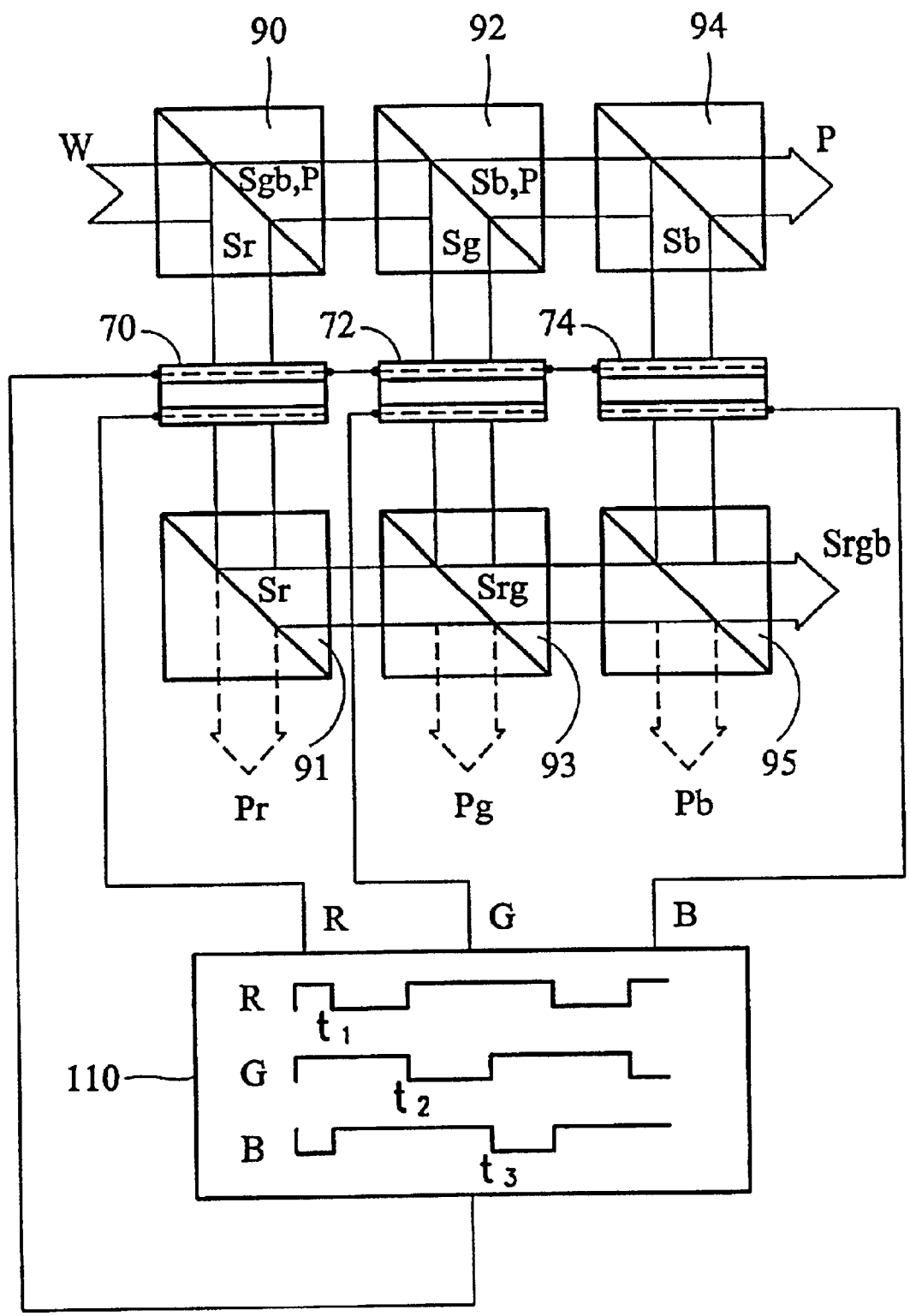
FIG. 2 is a diagram illustrating another prior-art color separator.

(ii) the color separator has a simpler structure than that using a transmissive liquid crystal panel as shown in FIG. 2.

(iii) the manufacturing process is simple since no precision alignment is required.

(iv) the light can be reflected back along the incident optical path when the FLC panel is switch-off, therefore it is not necessary to use any absorber to absorb the useless light.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fast time-sequential color-separating device including a plurality of modules sequentially connected to each other, in which each module includes a dichroic mirror, which can pass a certain wavelength range of light having a first polarization and reflect the other wavelength range of light having a first polarization, a polarizing beam-splitter for said certain wavelength range and a liquid crystal panel that can change the polarization of a light reflected by the liquid crystal panel if an external electric field is applied thereto, wherein the light having a first polarization reflected by the liquid crystal panel is reflected along the incident optical path while no external electric field is applied to the liquid crystal, the light having a first polarization reflected by the liquid crystal panel becomes a light having a second polarization if an external electric field is applied thereto, the light having a second polarization is then reflected by the polarizing beam splitter and is emitted along a direction that is orthogonal to the incident light, various modules passing various wavelength ranges are connected one by one, an external electric field is sequentially applied to the liquid crystal panel of each module, so that various wavelength ranges of lights having a first polarization is turned to lights having a second polarization and are sequentially emitted along the direction orthogonal to the incident light.

2. The color-separating device as claimed in claim 1 wherein the liquid crystal panel is a ferroelectric liquid crystal panel.

3. The color-separating device as claimed in claim 1 wherein the various wavelength ranges include the wavelength ranges of red light, green light and blue light.

4. A fast time-sequential color-separating device including:
   a prism module for separating an incident light into various wavelength ranges of light beams which are emitted from various prisms of the prism module;
   a plurality of ferroelectric liquid crystal panels, respectively placed on emerging surfaces of the various wavelength ranges of light beams, to reflect the various wavelength ranges of light beams to the prism module; and
   a power supply, respectively connected to the plurality of ferroelectric liquid crystal panels, for fast-switching the liquid crystal panels, respectively, to sequentially emit the various wavelength ranges of light beams from the prism module.

5. The color-separating device as claimed in claim 4 wherein the prism module includes six dichroic prisms.

6. The color-separating device as claimed in claim 4 wherein the power supply is a continuous pulse source.

7. The color-separating device as claimed in claim 4 wherein the number of the ferroelectric liquid crystal panels is 3.

8. The color-separating device as claimed in claim 4 wherein the various wavelength ranges include the wavelength ranges of red light, green light and blue light.

9. The color-separating device as claimed in claim 5 wherein the dichroic prism is replaced by a dichroic mirror.

10. A fast time-sequential color-separating liquid crystal projector including:
    a prism module that separates an incident light into various wavelength ranges of light beams which are emitted from various prisms of the prism module;
    a plurality of ferroelectric liquid crystal panels, respectively placed on emerging surfaces of the various wavelength ranges of light beams, to reflect the various wavelength ranges of light beams to the prism module; and
    a power supply, respectively connected to the plurality of ferroelectric liquid crystal panels, fast-switching the liquid crystal panels, respectively, to sequentially emit the various wavelength ranges of light beams from the prism module;
    a display module that receives and modulates the various wavelength ranges of light beams sequentially emitted from the prism module and then projects modulated light beams.

11. The liquid crystal projector as claimed in claim 10 wherein the display module is a single panel of transmissive liquid crystal light valve.

12. The liquid crystal projector as claimed in claim 10 wherein the display module is a single panel of reflective liquid crystal light valve.

13. The liquid crystal projector as claimed in claim 10 wherein the various wavelength ranges include the wavelength ranges of red light, green light and blue light.

14. The liquid crystal projector as claimed in claim 10 wherein the prism module includes six dichroic prisms.

15. The liquid crystal projector as claimed in claim 10 wherein the number of the ferroelectric liquid crystal panels is 3.

16. The liquid crystal projector as claimed in claim 10 wherein the power supply is a continuous pulse source.

17. The liquid crystal projector as claimed in claim 11 wherein the liquid crystal light valve is a ferroelectric liquid crystal light valve.

18. The liquid crystal projector as claimed in claim 12 wherein the liquid crystal light valve is a ferroelectric liquid crystal light valve.

* * * * *